US012698384B1

(12) United States Patent
Fan

(10) Patent No.: US 12,698,384 B1
(45) Date of Patent: Aug. 4, 2026

(54) BINARY FILLER-CONTAINING EXTRUDATE COMPOSITION AND BUILDING PRODUCTS FORMED FROM SAME

(71) Applicant: The AZEK Group LLC, Chicago, IL (US)

(72) Inventor: Jia Fan, Cincinnati, OH (US)

(73) Assignee: The AZEK Group LLC, Chicago, IL (US)

( * ) Notice: Subject to any disclaimer, the term of this patent is extended or adjusted under 35 U.S.C. 154(b) by 0 days.

(21) Appl. No.: 19/318,138

(22) Filed: Sep. 3, 2025

(51) Int. Cl.
*C08L 27/06* (2006.01)
*C08K 3/34* (2006.01)

(52) U.S. Cl.
CPC ............... *C08L 27/06* (2013.01); *C08K 3/34* (2013.01); *C08K 2003/343* (2013.01); *C08K 2201/004* (2013.01); *C08K 2201/016* (2013.01); *C08L 2201/08* (2013.01); *C08L 2205/03* (2013.01); *C08L 2205/06* (2013.01); *C08L 2207/20* (2013.01)

(58) Field of Classification Search
CPC .. C08L 27/06; C08L 2201/08; C08L 2205/03; C08L 2205/06; C08L 2207/20; C08K 3/34; C08K 2003/343; C08K 2201/004; C08K 2201/016
USPC ......................................................... 523/220
See application file for complete search history.

(56) References Cited

U.S. PATENT DOCUMENTS

| | | | |
|---|---|---|---|
| 2017/0240737 A1* | 8/2017 | Peterson ................... | C08K 3/34 |
| 2021/0017372 A1* | 1/2021 | Walia .................... | C08L 51/003 |
| 2023/0357471 A1* | 11/2023 | Cornetta ............... | C08L 51/003 |

* cited by examiner

*Primary Examiner* — Hannah J Pak
(74) *Attorney, Agent, or Firm* — GREENBERG TRAURIG, LLP

(57) ABSTRACT

A composition includes about 60 to about 90 wt. % polyvinyl chloride (PVC) resin, about 10 to about 40 wt. % filler material, where the filler material includes about 25 to about 75 wt. % wood flour and about 25 to about 75 wt. % wollastonite, about 1 to about 2 wt. % heat stabilizer, and about 0.1 to about 3 wt. % lubricant.

14 Claims, 13 Drawing Sheets

Wood Fibers, 5:1

Wollastonite. 13:1

Microscopy

Microscopy

Sample E, +20% Wood and 15% Wollastonite

Sample D, +20% Wood

Flexural Properties

| | Strength<br>Mu @ 3% Strain (in-lbf) | Stiffness<br>E (lbf-in^2) | |
|---|---|---|---|
| PVC Decking Control from Plant | 3013 | -31% | 79744 | -25% |
| A - Bevel | 4341 | 0 | 106012 | 0 |
| B with 10% Wood | 4022 | -7% | 111211 | 5% |
| C with 15% Wood | 3511 | -19% | 91153 | -14% |
| D with 20% Wood | 3864 | -11% | 122122 | 15% |
| E with 20% Wood, 15% Wollastonite | 3209 | -26% | 96994 | -9% |

FIG. 6

BINARY FILLER-CONTAINING EXTRUDATE COMPOSITION AND BUILDING PRODUCTS FORMED FROM SAME

BACKGROUND

The present disclosure relates generally to polyvinyl chloride (PVC)-based profiles such as decking boards, railing, trim, and the like, and more specifically to extrudate compositions and extrusion methods for manufacturing rigid polyvinyl chloride (PVC)-based profiles having improved mechanical properties and aesthetics.

SUMMARY

Disclosed are extrudate compositions and building products formed from extrudate compositions that include a polyvinyl chloride (PVC) resin matrix and a binary filler system of wood flour and wollastonite. The extrudate compositions generally include 60 to 90 weight percent PVC resin, 10 to 40 weight percent filler material (with the filler containing 25 to 75 weight percent wood flour and 25 to 75 weight percent wollastonite), 1 to 2 weight percent heat stabilizer, and 0.1 to 3 weight percent lubricant.

The PVC resin may be recycled, virgin, or a combination of both. In some embodiments, the wood flour and wollastonite are present as acicular (needle-like) particles, with the wood flour having an average length of about 50 to 1000 micrometers and an aspect ratio of 5:1 to 15:1, and the wollastonite having an average length of about 20 to 100 micrometers and an aspect ratio of 10:1 to 20:1. The heat stabilizer and lubricant may be selected from various materials, such as organotin, calcium-zinc, or barium-zinc stabilizers, and stearic acid, calcium stearate, or polyethylene wax, respectively.

Disclosed also are building articles, such as decking, trim, siding, molding, and fencing, formed from these compositions by extrusion, where the wood flour and wollastonite are dispersed throughout the PVC matrix and may be substantially aligned along the extrusion direction. The body of the article may include 60 to 90 weight percent PVC resin, 5 to 30 weight percent wood flour, and 5 to 30 weight percent wollastonite.

Some embodiments relate to methods of manufacturing these building products by mixing PVC resin with the binary filler system, processing the mixture in an extruder to form a homogeneous melt, and extruding the melt through a die to form the final product. The compositions and articles provide improved mechanical properties, dimensional stability, and surface aesthetics, including enhanced paintability.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6 is a table summarizing the flexural properties of PVC-based profiles with various extrudate compositions according to some embodiments.

Figure 1:
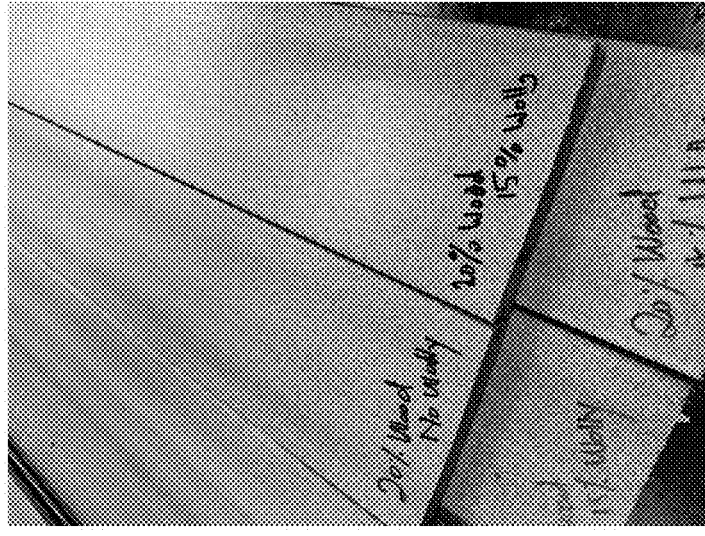
FIG. 1 is a series of images showing the surface finish of various extruded PVC-based profiles according to some embodiments.
Figure 1:
Figure 1:
Figure 1:
Figure 1:
Figure 1:

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polyvinyl chloride (PVC)-based building products are widely used in the construction industry due to their durability, resistance to moisture and decay, and ease of fabrication. These products—including decking, trim, siding, molding, and fencing—are valued for their lightweight nature and versatility in a range of architectural and structural applications.

As the demand for sustainable and cost-effective materials increases, manufacturers are seeking to deliver products that meet mechanical performance standards, such as strength, stiffness, and dimensional stability, while also providing desirable surface aesthetics.

Mechanical properties help ensure that building products can withstand environmental stresses, impacts, and long-term use without significant warping, cracking, or loss of structural integrity. At the same time, aesthetic qualities such as surface texture, paintability, and color uniformity are important for meeting consumer preferences and design requirements. Traditional solutions to enhance appearance—such as applying cap layers or co-extruded surfaces—can add manufacturing complexity and cost.

There is ongoing interest in developing material compositions and processing methods that provide a balance of mechanical durability and attractive surface characteristics, while also supporting efficient production and the use of recycled content. Addressing these considerations may help advance the performance and broader adoption of PVC-based building products in construction.

Disclosed are extrudate compositions and methods for forming PVC-based building products. Extrusion is a manufacturing process that allows for the continuous production of profiles with consistent cross-sectional shapes. In such a process, ingredients including PVC resins, fillers, stabilizers, lubricants, and other additives may be premixed or individually fed into an extruder, where they are subjected to heat and shear to form a homogeneous melt. The material is then forced through a die to create the desired profile, which is subsequently cooled and cut to length.

The composition of the extrudate can influence the final product's mechanical and aesthetic properties, including one or more of stiffness, strength, coefficient of thermal expansion (CTE), density, color, moisture absorption, paintability, and the like. Additionally, the extrudate composition may affect processability, including foamability.

In some embodiments, as disclosed herein, a PVC resin-based extrudate composition includes a binary filler system-containing wood flour and wollastonite ($CaSiO_3$)—that is adapted to be dispersed throughout the PVC matrix. The binary filler has been shown to provide a combination of improved strength, stiffness, dimensional stability, and surface appearance. By way of example, an extrudate composition may include about 60 to 90 wt. % PVC resin, about 10 to 40 wt. % filler material (with the filler containing about 25 to 75 wt. % wood flour and 25 to 75 wt. % wollastonite), about 1 to 2 wt. % heat stabilizer, and about 0.1 to 3 wt. % lubricant. This formulation allows for flexibility in manufacturing and also supports the use of recycled PVC, while achieving a balance of performance and visual qualities in the finished building products.

In some embodiments, an extrudate composition includes 60 to 90 wt. % polyvinyl chloride (PVC) resin, 2.5 to 30 wt. % wood flour, 2.5 to 30 wt. % wollastonite, 1 to 2 wt. % heat stabilizer, and 0.1 to 3 wt. % lubricant. By way of further example, the wood flour content may range from 5 to 20 wt. % and the wollastonite content may range from 5 to 20 wt. %. That is, an extrudate composition may include a total filler content ranging from about 10 wt. % to about 40 wt. %, e.g., 10, 15, 20, 25, 30, 35, or 40 wt. %, including ranges between any of the foregoing values. In some examples, the wood flour content and the wollastonite content may each independently range from about 2.5 wt. % to about 30 wt. %, e.g., 2.5, 5, 10, 15, 20, 25, or 30 wt. %, including ranges between any of the foregoing values. Within a binary filler system, the ratio of wood flour to wollastonite may range from about 1:3 to about 3:1, e.g., 1:3, 1:2, 1:1, 2:1, or 3:1, including ranges between any of the foregoing ratios.

The disclosed binary filler system allows for the production of extruded building products—such as decking, trim, siding, molding, and fencing—that exhibit commercially relevant strength, stiffness, reduced thermal expansion, and improved surface appearance, including paintability.

As will be appreciated, the paintability of a PVC-based building product may be enhanced by the incorporation of a binary filler system in the extrudate composition. Both wood flour and wollastonite are polar fillers, and their incorporation into the polymer matrix may yield a more polar surface. This increased polarity may improve the adhesion of paint coatings, allowing for better coverage, reduced show-through, and longer-lasting finishes compared to less polar or non-polar extrudate compositions.

Wood flour and wollastonite may be selected and combined to provide synergistic effects where, by way of example, the wood flour contributes to a natural wood-like texture and paintability, and the wollastonite enhances dimensional stability and mechanical performance, particularly by reducing the coefficient of linear thermal expansion (CLTE). Particles of wood flour may be acicular with an average length ranging from about 50 micrometers to about 1000 micrometers (e.g., 50, 100, 200, 300, 400, 500, 600, 700, 800, 900, or 1000 micrometers, including ranges between any of the foregoing values) and an aspect ratio of ranging from 5:1 to 15:1. Particles of wollastonite may be acicular with an average length ranging from about 20 micrometers to about 100 micrometers (e.g., 20, 30, 40, 50, 60, 70, 80, 90, and 100 micrometers, including ranges between any of the foregoing values) and an aspect ratio ranging from 10:1 to 20:1. The term "particles" as used herein may refer to needle-like (acicular) shapes.

Whereas an excess wood flour content may contribute to undesired water uptake/retention in a resulting building product, through use of a binary filler composition the extrudate may incorporate up to about 30 wt. % total wood flour (e.g., 2.5, 5, 7.5, 10, 15, 20, 25, or 30 wt. %, including ranges between any of the foregoing values). The wood flour may be well wetted by the polymer and provide both mechanical and aesthetic benefits, such as improved strength, dimensional stability, and a wood-like surface appearance.

According to some embodiments, a heat stabilizer may include one or more of an organotin stabilizer, a calcium-zinc stabilizer, and a barium-zinc stabilizer. According to some embodiments, a lubricant may include one or more of stearic acid, calcium stearate, and polyethylene wax. The extrudate composition may additionally include a polymer modifier, which may be adapted to enhance interfacial bonding between the polymer matrix and the filler particles.

According to some embodiments, a building product may include a body formed from polyvinyl chloride (PVC) resin with first and second filler materials dispersed throughout the body, where the first filler material includes particles of wood flour, and the second filler material includes particles of wollastonite. The building product may be an extruded article where the particles of wood flour and the particles of wollastonite are acicular particles each substantially aligned along an extrusion direction of the body. Dimensional stability in the extrusion direction, which may correspond to the longitudinal direction of a decking board, for example, beneficially minimizes expansion, contraction, warping and/or bowing of the decking board over time and under varying environmental conditions. Enhanced longitudinal stability reduces the propensity of gaps, buckling, or misalignment, resulting in a more durable, reliable, and aesthetically consistent installation.

In some embodiments, the PVC resin may include recycled polyvinyl chloride and/or virgin polyvinyl chloride. In accordance with some embodiments, through the use of a binary filler system, the extrudate composition may be formulated with an overall higher content of recycled PVC. For example, coloring provided by the wood flour can mask incumbent coloring in the recycled material.

Extrusion processing allows for the use of recycled PVC and can accommodate a range of particle sizes and aspect ratios for the filler materials. In some embodiments, a monochromatic extruded product can be produced without a cap layer or coextrusion, allowing it to be used in its as-extruded form or finished with customized paint colors as desired, potentially reducing manufacturing complexity and cost, while still achieving desirable surface aesthetics and durability.

An extruder apparatus, as referenced in the context of PVC-based building product manufacturing, may be designed for processing thermoplastic materials such as polyvinyl chloride (PVC). In the trials described herein, parallel counter-rotating twin-screws with a length-to-diameter (L/D) ratio of 33 were used. The apparatus features double compression and throttle zones along the screws, which are engineered to provide gradual compression, thorough mixing, and controlled shear of the material blend. The parallel twin-screw configuration is suited for processing formulations with high filler content, such as combinations of wood flour and wollastonite, and for achieving consistent melt quality and homogeneity. The extruder apparatus is capable of output rates around 300 lbs/hr and is adaptable for producing a variety of profile shapes used in decking, trim, and other building products. In some embodiments, a breaker plate may be installed over an output of the extrusion die to facilitate fiber alignment along the extrusion direction, which may improve one or more mechanical properties in the building product.

During the extrusion process, dry wood flour and wollastonite may be either pre-blended or fed separately into the extruder with PVC resin. The resulting extruded profiles may be lightweight due to a foaming process, and they demonstrate improved dimensional stability as a result of the combined effects of wood flour and wollastonite. Additionally, the manufactured profiles offer enhanced surface aesthetics, including a wood-like texture and improved paintability.

In some embodiments, the extruder and screw design may be engineered to manage the moisture content of the wood flour by incorporating features such as increased compression, enhanced moisture extraction, and improved venting. For example, the screw may include specialized venting zones or vacuum ports along its length to facilitate the removal of moisture and volatiles during processing, helping to ensure consistent melt quality and prevent defects in the final extruded product.

A method of forming a building product includes mixing polyvinyl chloride (PVC) resin with a binary filler system including wood flour and wollastonite to form an extrudate composition, feeding the extrudate composition into an extruder, processing the extrudate composition to form a homogeneous melt, and extruding the homogeneous melt through a die of the extruder to form a building product.

Example and comparative extrudate compositions are summarized below in Table 1. An example Base Blend composition as used in Table 1 is shown in Table 2. Corresponding aesthetic and performance related properties for decking profiles formed from the extrudate compositions of Table 1 are discussed with reference to FIGS. 1-9.

According to some embodiments, the extrudate compositions have a thermogravimetric analysis (TGA)-derived ash content of less than about 30 wt. %, e.g., 1, 2, 5, 10, 15, 20, 25, or 30 wt. %, including ranges between any of the foregoing values.

TGA ash content refers to the percentage of inorganic residue (ash) remaining after a sample is subjected to thermogravimetric analysis (TGA). In TGA, samples are gradually heated in a controlled environment, and weight loss is measured as volatile components (such as water and organics) are driven off. The remaining non-volatile residue at the end of the test is considered the "ash content."

In the context of PVC-based building products, TGA ash content provides a quantitative measure of the total inorganic filler content (such as wollastonite, calcium carbonate, or other minerals) present in the extrudate composition. The ash content value may be useful for verifying formulation consistency and assessing the proportion of fillers relative to the polymer matrix.

TABLE 1

Extrudate Compositions for Sample Profiles

| Sample Code | Description | Wood Content (wt. %) | Wollastonite Content (wt. %) |
|---|---|---|---|
| Control | Production sample | 0 | 0 |
| A | Base blend | 0 | 0 |
| B | Base blend + wood | 10 | 0 |
| C | Base blend + wood | 15 | 0 |
| D | Base blend + wood | 20 | 0 |
| E | Base blend + wood + wollastonite | 20 | 15 |

TABLE 2

Base Blend Composition for Sample Profile

| Component | Content (wt. %) |
|---|---|
| PVC Resin | 80.61 |
| Organotin Thermal Stabilizer | 1.61 |
| Ester Compound (lubricant) | 0.97 |
| Oxidized Polyethylene (lubricant) | 1.09 |
| Acrylic 1 (processing aid) | 7.66 |
| Acrylic 2 (processing aid) | 1.61 |
| Styrene Acrylonitrile 1 (polymer modifier) | 3.63 |
| Styrene Acrylonitrile 2 (compatibility promoter) | 2.82 |

Turning to the figures, FIG. 1 is a series of optical images showing the physical appearance of various extruded PVC-based profiles. These images highlight differences in surface texture and appearance, particularly with reference to the wood-like texture achieved in samples containing both wood flour and wollastonite.

Figure 2:
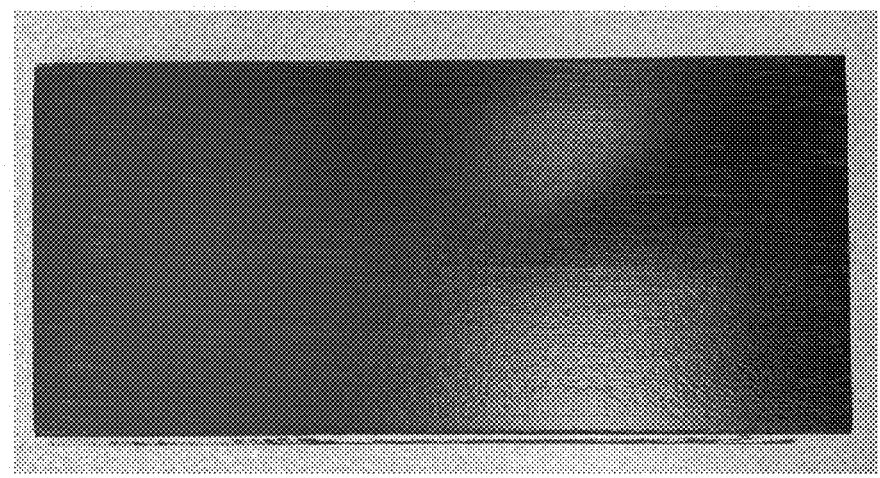
FIG. 2 is an image of a painted PVC-based profile according to some embodiments.

FIG. 2 is a photograph of a painted decking profile including 15 wt. % wood flour and 15 wt. % wollastonite. For a paint coating having a thickness of about 1 mil, the painted surface exhibits minimal show through and an adhesion metric of 5B following drying at ~23° C. The adhesion test involves using a crosshatch cutter to make a grid pattern on the painted surface. Then, a pressure-sensitive adhesive tape is applied to the grid and quickly removed. The amount of coating that remains affixed to the surface determines the adhesion level. An adhesion metric of 5B represents the highest level of adhesion, meaning that no coating is removed during the test, and the paint is highly adherent to the substrate.

Figure 3:
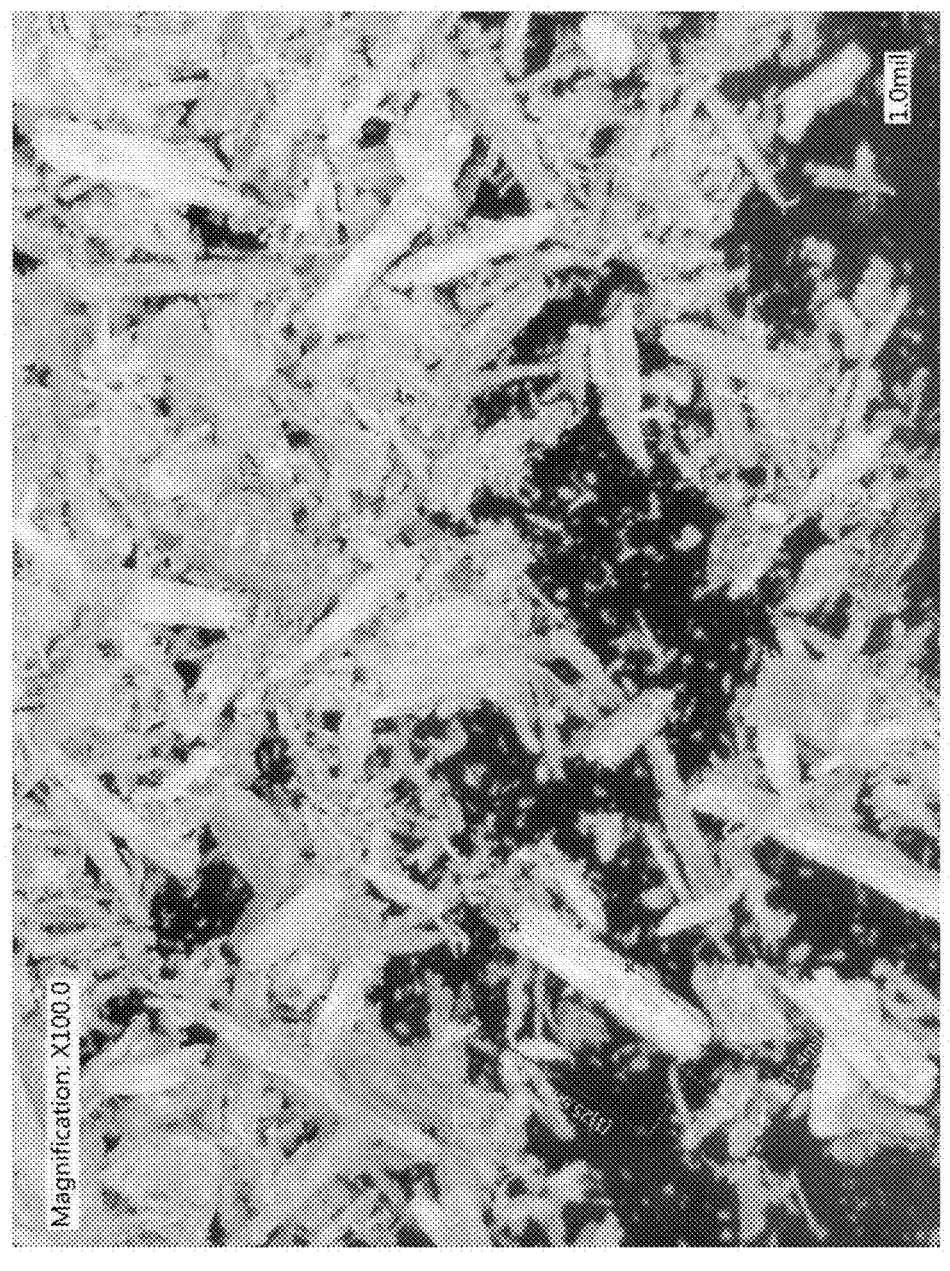
FIG. 3 is an image showing the morphology of acicular wood fibers according to some embodiments.
Figure 4:
FIG. 4 is an SEM micrograph showing the morphology of acicular wollastonite needles according to some embodiments.

An optical photograph of example wood flour particles is shown in FIG. 3 and a scanning electron microscope (SEM) micrograph of example wollastonite ($CaSiO_3$) particles is shown in FIG. 4. As shown, the acicular wood flour particles have an average length ranging from about 50 micrometers to about 1000 micrometers and have an aspect ratio ranging from about 5:1 to about 15:1. The mineral particles of wollastonite are needle-like with an average length ranging from about 20 micrometers to about 100 micrometers and an aspect ratio ranging from about 10:1 to about 20:1.

Figure 5:
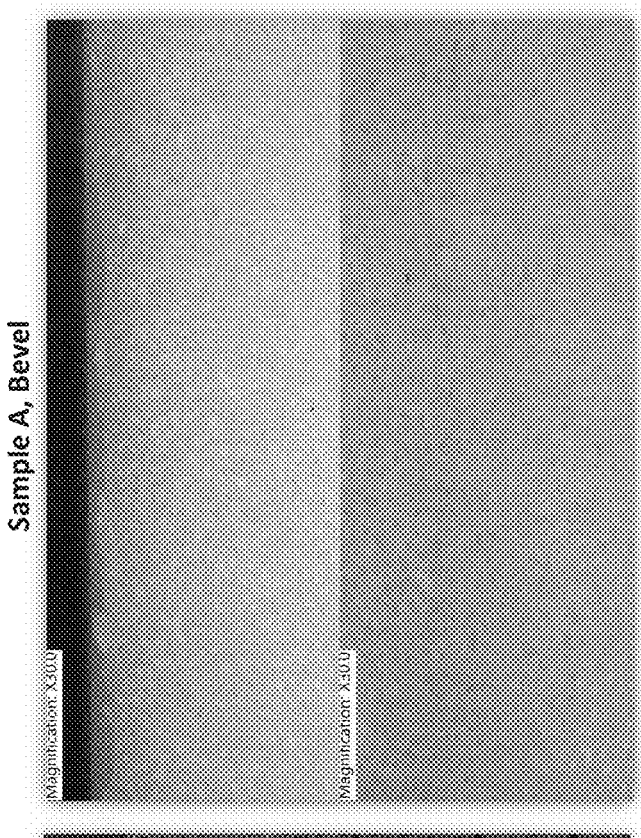
FIG. 5 presents a series of images illustrating the microstructure of PVC-based profiles having various extrudate compositions according to some embodiments.
Figure 5:
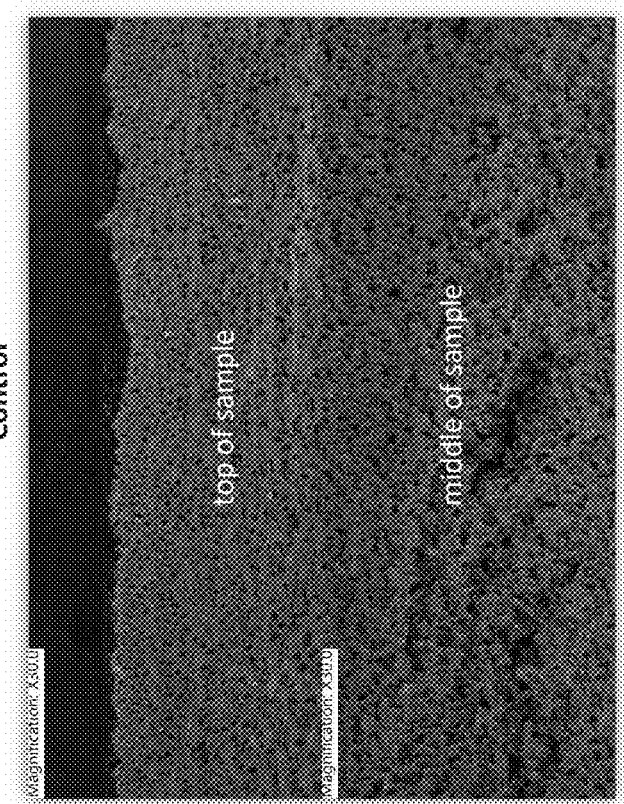
Figure 5:
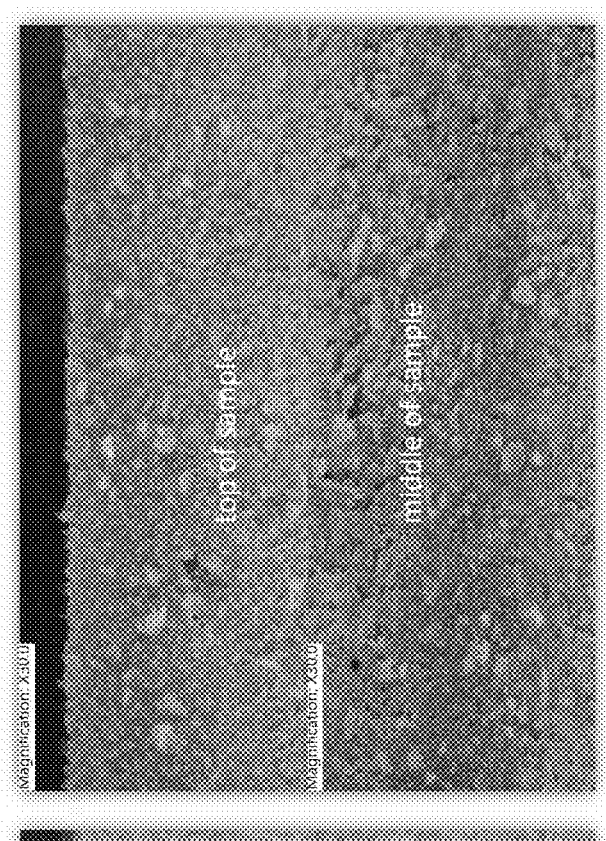
Figure 5:
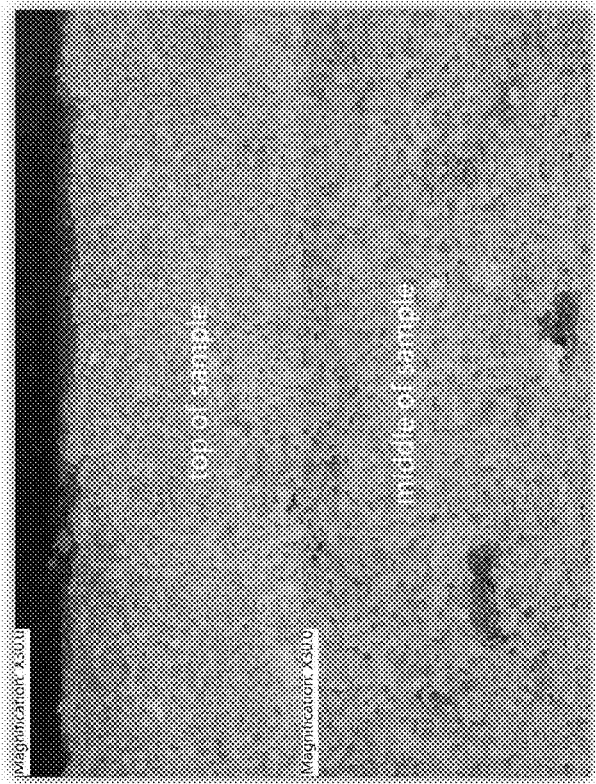
Figure 5:
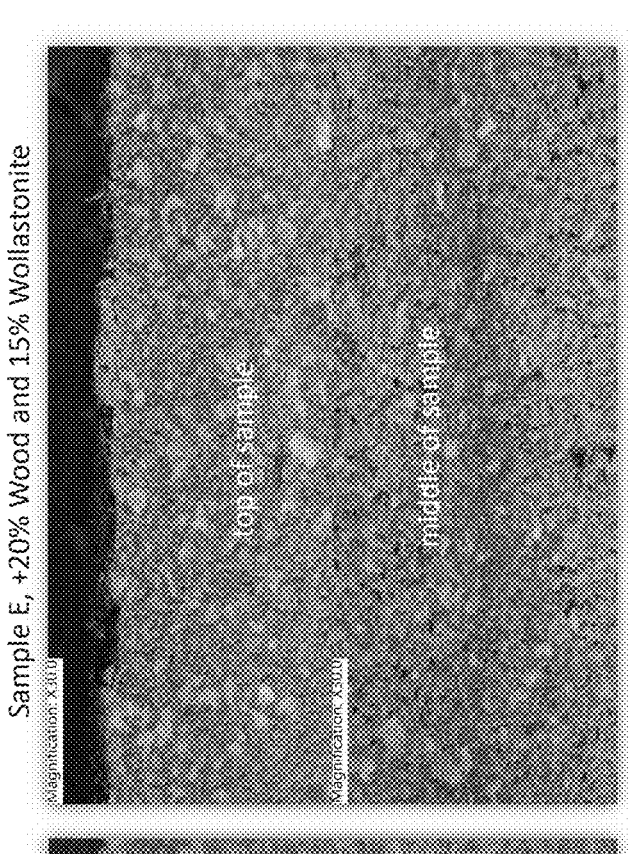
Figure 5:
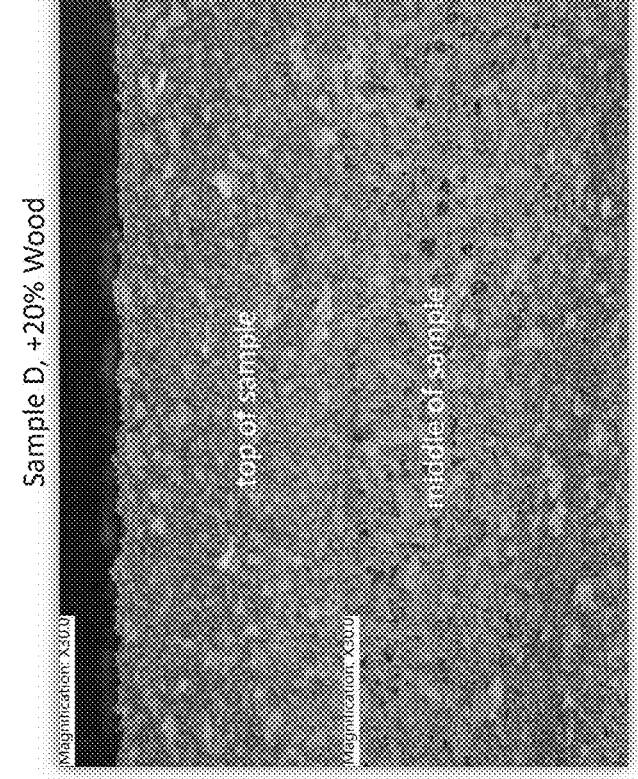

Referring to FIG. 5, shown are images of the microstructure in both the near surface and central regions of decking profiles having different filler compositions.

Impact testing was conducted on the extruded profiles to evaluate their resistance to sudden force and assess their suitability for building product applications. In the trials, samples were subjected to a 30-pound impact test at varying drop heights, with all samples showing no breakage up to a height of 42 inches (equivalent to a 1260-pound drop impact). These results indicate that profiles incorporating wood flour and wollastonite exhibit robust impact resistance, meeting or exceeding the performance requirements for decking, trim, and similar building products. The ability to withstand high-impact forces without failure demonstrates the mechanical durability of the binary filler system in the PVC matrix.

Referring to FIG. 6, flexural testing of the extruded PVC-based profiles revealed that the incorporation of wood flour and wollastonite can maintain or improve mechanical performance compared to control samples. For example, profiles with up to 20% wood flour and 15% wollastonite demonstrated flexural strength and stiffness values that are comparable to or exceed those of the control sample. The data show that even with increased filler content, the profiles retain favorable bending strength (MOR) and flexural rigidity (MOE), indicating that the binary filler system supports the development of building products with robust structural properties.

Linear density data for the extruded samples indicate that the various formulations have comparable weight per foot, reflecting similar overall densities across the different profiles. Adjustments to the foaming process can further fine-tune the density, allowing the trial samples to closely match the linear density of the decking control.

Figure 7:
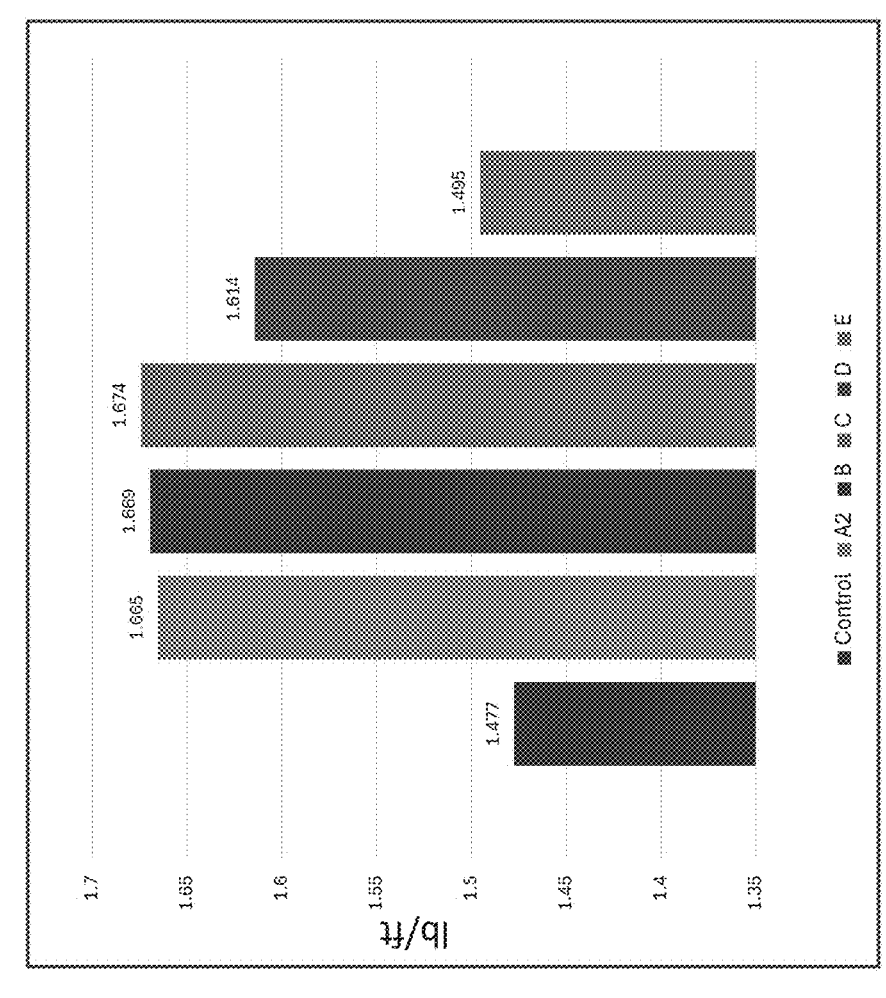
FIG. 7 is a graph comparing the linear density of PVC-based decking profiles having various extrudate compositions according to some embodiments.

As shown in FIG. 7, the linear density of Sample E (20 wt. % wood and 15 wt. % wollastonite) is less than the linear density of Samples A-D and comparable to the linear density of the control sample, indicating that the incorporation of wood flour and wollastonite may beneficially decrease the weight of the final product relative to non-binary filler containing samples, supporting the production of light-weight building materials.

Figure 8:
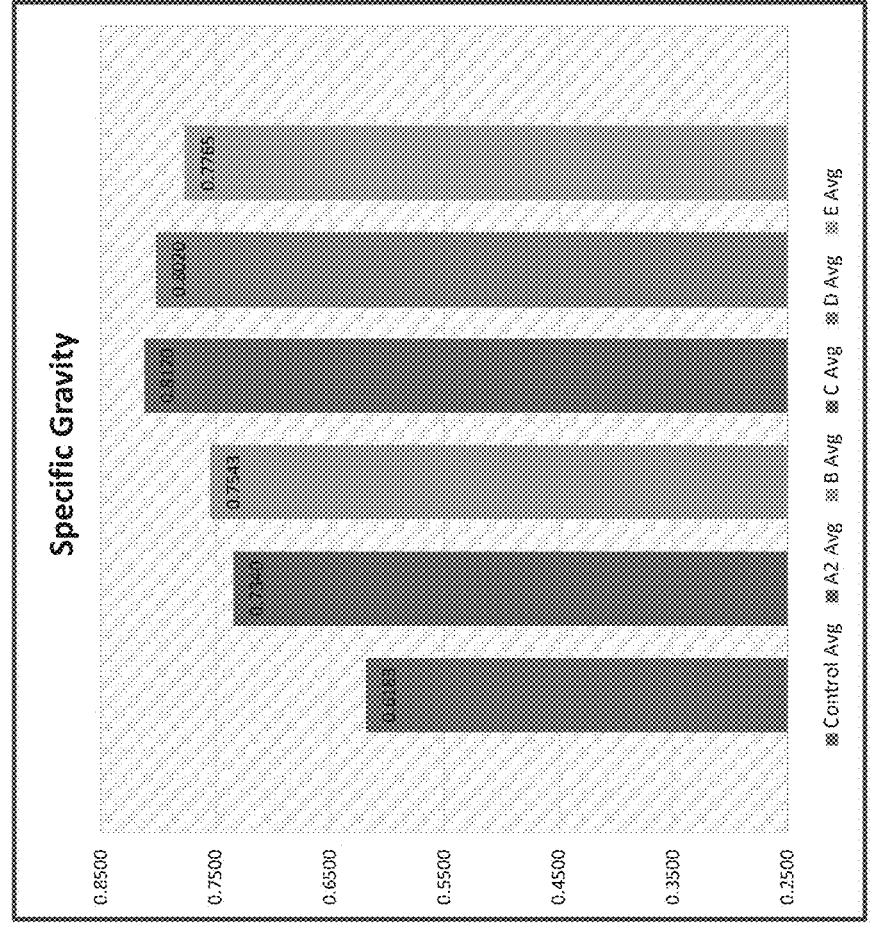
FIG. 8 is a graph comparing the specific gravity of example extrudate compositions according to some embodiments.

Specific gravity data were collected for various extruded PVC-based profiles to assess the density and material composition of the samples. Referring to FIG. 8, the results show that profiles containing different ratios of wood flour, wollastonite, and recycled PVC exhibit specific gravities in the range of about 0.7 to 0.8 g/cc. For example, the sample containing 15% wood flour and 15% wollastonite had a specific gravity of about 0.78 g/cc. The measured values are comparable to or slightly greater than the reference Bevel profile (Sample A), which has a specific gravity of about 0.73 g/cc. The data indicate that the incorporation of wood flour and wollastonite, as well as the use of recycled PVC, can be adjusted to achieve target density levels suitable for building product applications, while also supporting lightweight construction and material cost savings.

Figure 9:
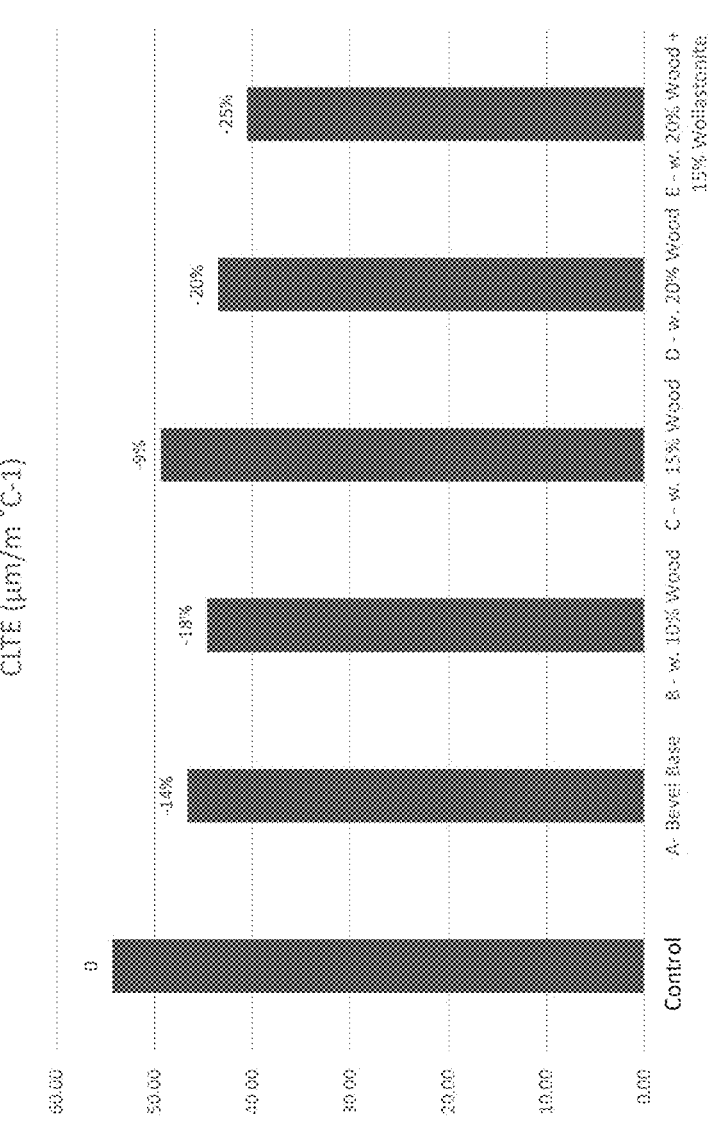
FIG. 9 is a graph comparing thermal expansion of PVC-based decking profiles having various extrudate compositions according to some embodiments.

Thermal expansion data for the extruded PVC-based profiles were evaluated using coefficient of linear thermal expansion (CLTE) measurements. The results demonstrate that incorporating wood flour and wollastonite as a binary filler system into the PVC matrix leads to a notable reduction in thermal expansion compared to control samples. For example, as shown in FIG. 9, a formulation containing 20 wt. % wood flour and 15 wt. % wollastonite showed approximately a 25% improvement (reduction) in CLTE over the control, while 20% wood flour alone resulted in nearly a 20% reduction.

These data indicate that the binary filler system effectively enhances the dimensional stability of the extruded profiles, making them less susceptible to expansion and contraction with temperature changes. This improvement is valuable for building products such as decking, trim, and siding, where dimensional stability under varying environmental conditions is an important performance attribute.

Figure 10:
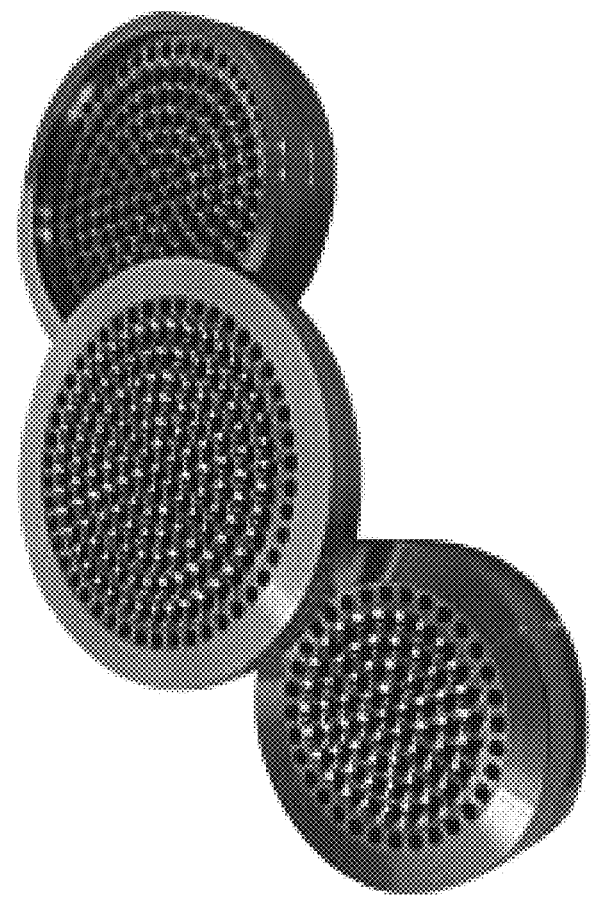
FIG. 10 is a perspective view of example breaker plate geometries according to some embodiments.

With reference to FIG. 10, according to some embodiments, an extruder apparatus may be fitted with a breaker plate. As used herein, a breaker plate is a component that may be installed proximate to the end of the screw, before the extrusion die. As shown in the figure, a breaker plate may be configured as a relative thick, perforated metal disk with multiple small holes.

During operation of the extruder apparatus, the breaker plate may be adapted to provide resistance to the flow of the molten extrudate, promote uniform pressure, and improve the mixing and homogenization of the polymer melt. In addition, the breaker plate may filter un-melted particles or contaminants from the extrudate composition and promote the alignment of acicular filler particles, such as wood flour and wollastonite, along the extrusion direction.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the terms "approximately" and "about" in reference to a particular numeric value or range of values may, in certain embodiments, mean and include the stated value as well as all values within 10% of the stated value. Thus, by way of example, reference to the numeric value "50" as "about 50" may, in certain embodiments, include values equal to 50±5, i.e., values within the range 45 to 55.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a resin that comprises or includes polyvinyl chloride include embodiments where a resin consists essentially of polyvinyl chloride and embodiments where a resin consists of polyvinyl chloride.

What is claimed is:

1. A composition comprising:
about 60 to about 90 wt. % polyvinyl chloride (PVC) resin;
about 10 to about 40 wt. % filler material;
wherein the filler material comprises:
about 25 to about 75 wt. % wood flour and
about 25 to about 75 wt. % wollastonite,
about 1 to about 2 wt. % heat stabilizer; and
about 0.1 to about 3 wt. % lubricant, wherein the wood flour comprises acicular particles having an average length of 50 micrometers to 1000 micrometers and an aspect ratio of 5:1 to 15:1; wherein the wollastonite comprises acicular particles having an average length of 20 micrometers to 100 micrometers and an aspect ratio of 10:1 to 20:1; and a weight ratio of the wood flour to the wollastonite is 1:3 to 3:1.

2. The composition of claim 1, wherein the polyvinyl chloride (PVC) resin comprises recycled polyvinyl chloride (PVC).

3. The composition of claim 1, wherein the polyvinyl chloride (PVC) resin comprises recycled polyvinyl chloride (PVC) and virgin polyvinyl chloride (PVC).

4. The composition of claim 1, wherein the heat stabilizer is selected from the group consisting of organotin stabilizers, calcium-zinc stabilizers, barium-zinc stabilizers, and combinations thereof.

5. The composition of claim 1, wherein the lubricant is selected from the group consisting of stearic acid, calcium stearate, and polyethylene wax.

6. A composition comprising:
60 to 90 wt. % polyvinyl chloride (PVC) resin;
2.5 to 30 wt. % wood flour; and
2.5 to 30 wt. % wollastonite, wherein the wood flour comprises acicular particles having an average length of 50 micrometers to 1000 micrometers and an aspect ratio of 5:1 to 15:1; the wollastonite comprises acicular particles having an average length of 20 micrometers to 100 micrometers and an aspect ratio of 10:1 to 20:1; and a weight ratio of the wood flour to the wollastonite is 1:3 to 3:1.

7. The composition of claim 6, further comprising:
1 to 2 wt. % heat stabilizer and
0.1 to 3 wt. % lubricant.

8. The composition of claim 6, comprising:
5 to 20 wt. % wood flour and
5 to 20 wt. % wollastonite.

9. The composition of claim 7, wherein the heat stabilizer is selected from the group consisting of organotin stabilizers, calcium-zinc stabilizers, barium-zinc stabilizers, and combinations thereof.

10. The composition of claim 7, wherein the lubricant is selected from the group consisting of stearic acid, calcium stearate, and polyethylene wax.

11. An article comprising:
a body comprising polyvinyl chloride (PVC) resin; and
first and second filler materials dispersed throughout the body, wherein the first filler material comprises particles of wood flour, and wherein the second filler material comprises particles of wollastonite, wherein the body comprises 60 to 90 wt % polyvinyl chloride (PVC) resin, 5-30 wt. % wood flour particles and 5 to 30 wt % wood flour particles,
wherein the particles of wood flour comprise acicular particles having an average length of 50 micrometers to 1000 micrometers and an aspect ratio of 5:1 to 15:1, and the particles of wollastonite comprise acicular particles having an average length of 20 micrometers to 100 micrometers and an aspect ratio of 10:1 to 20:1; and a weight ratio of the wood flour particles to the wollastonite particles is 1:3 to 3:1.

12. The article of claim 11, wherein the particles of wood flour and wollastonite are acicular particles substantially aligned along an extrusion direction of the body.

13. The article of claim 11, wherein the body comprises:
60 to 90 wt. % polyvinyl chloride (PVC) resin;
5 to 20 wt. % wood flour particles; and
5 to 20 wt. % wollastonite particles.

14. A composition comprising:
60 to 90 wt. % polyvinyl chloride (PVC) resin;
2.5 to 30 wt. % wood flour;
2.5 to 30 wt. % wollastonite;
1 to 2 wt. % heat stabilizer; and
0.1 to 3 wt. % lubricant,
wherein the wood flour comprises acicular particles having an average length of 50 micrometers to 1000 micrometers and an aspect ratio of 5:1 to 15:1;
wherein the wollastonite comprises acicular particles having an average length of 20 micrometers to 100 micrometers and an aspect ratio of 10:1 to 20:1;
wherein a weight ratio of the wood flour to the wollastonite is 1:3 to 3:1; and
wherein the composition has a thermogravimetric analysis (TGA)-derived ash content of less than 30 wt. %.

* * * * *